United States Patent [19]

Johnson et al.

[11] 4,174,890
[45] Nov. 20, 1979

[54] ELECTRONICALLY CONTROLLED MICROFILM PHOTOGRAPHIC IMAGE UTILIZATION DEVICE

[75] Inventors: Delmar R. Johnson; John R. Flint, both of Barrington; Thomas R. Wells, Des Plaines; Rolf B. Erikson, Lincolnwood; Bruce A. Rady, Palatine, all of Ill.

[73] Assignee: Bell & Howell Company, Chicago, Ill.

[21] Appl. No.: 872,093

[22] Filed: Jan. 25, 1978

Related U.S. Application Data

[62] Division of Ser. No. 711,180, Aug. 3, 1976, Pat. No. 4,110,020.

[51] Int. Cl.² .................. G03B 23/08; G03B 23/12; G03B 21/14; G06K 7/00
[52] U.S. Cl. .................. 353/26 A; 235/463; 353/27 A; 353/101; 364/200
[58] Field of Search .......... 235/463; 353/27 R, 27 A, 353/26 R, 26 A, 101

[56] References Cited

U.S. PATENT DOCUMENTS

| | | | |
|---|---|---|---|
| 2,130,562 | 9/1938 | Pratt | 353/26 R |
| 3,184,177 | 5/1965 | Hannah | 242/188 |
| 3,290,987 | 12/1966 | James et al. | 353/26 A |
| 3,699,312 | 10/1972 | Jones et al. | 235/474 |
| 3,743,400 | 7/1973 | Haning et al. | 353/26 A |
| 3,751,152 | 8/1973 | Rinehart | 353/26 A |
| 3,809,468 | 5/1974 | Moritz | 353/26 A |
| 3,822,090 | 7/1974 | Mak et al. | 353/27 R |
| 3,926,513 | 12/1975 | Silver et al. | 353/26 R |
| 4,110,020 | 8/1978 | Johnson et al. | 353/26 A |

Primary Examiner—Steven L. Stephan
Attorney, Agent, or Firm—Harry G. Thibault; Alan B. Samlan

[57] ABSTRACT

An electronically controlled photographic image utilization device is arranged to transport a roll of microfilm having all images printed thereon in separate photographic areas, each area being arranged in a microfiche-type format. The photographic image utilization device has an automatic call-up feature so that any given photographic area may be selected in a first dimension and projected responsive to the push of a button, the operation of a rotary switch or both. A special bar code is printed along the edge of the film and used in conjunction with a closed loop film control system to eliminate the need for precise, clock-controlled synchronization between the film transport and the code reading. Preferably, the bar code is read by optical electronic sensors. Responsive thereto, the electronic control system accurately positions a selected photographic image, on the microfilm, within a viewing area. Thereafter, and while the film transport is being held stationary, any image on the microfilm may be selected for projection by a manual movement in second and third dimensions of a simple lens positioning mechanism which is small, compact, and easily moved. The reader may also be operated manually so that the automatic controls may be bypassed, if desired.

23 Claims, 16 Drawing Figures

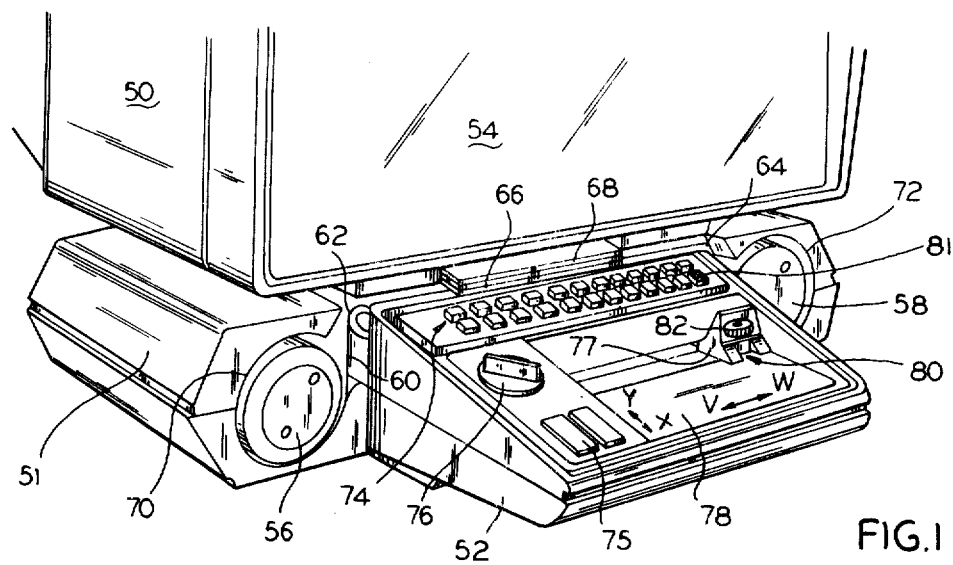
FIG.1
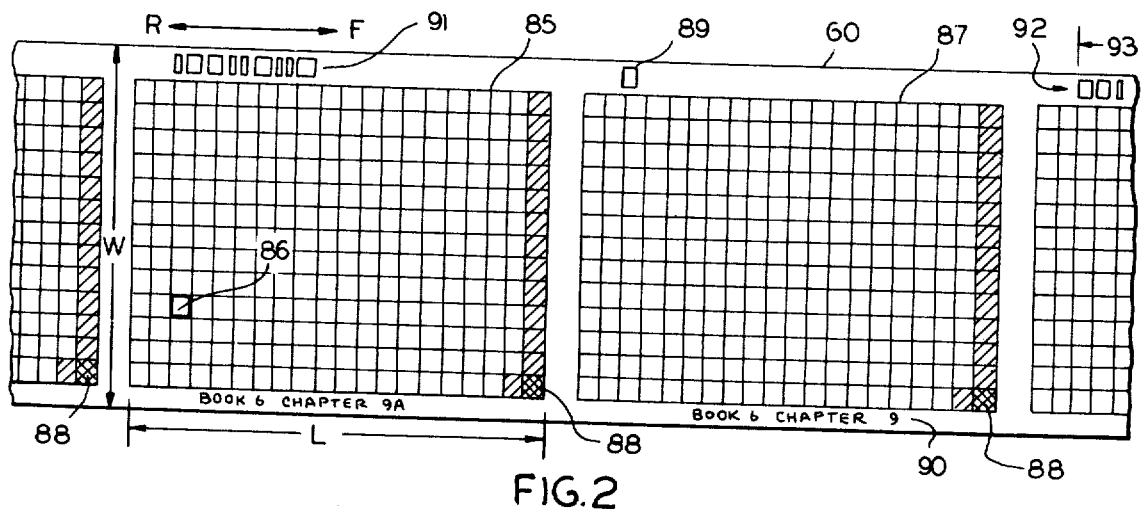
FIG.2
FIG.3

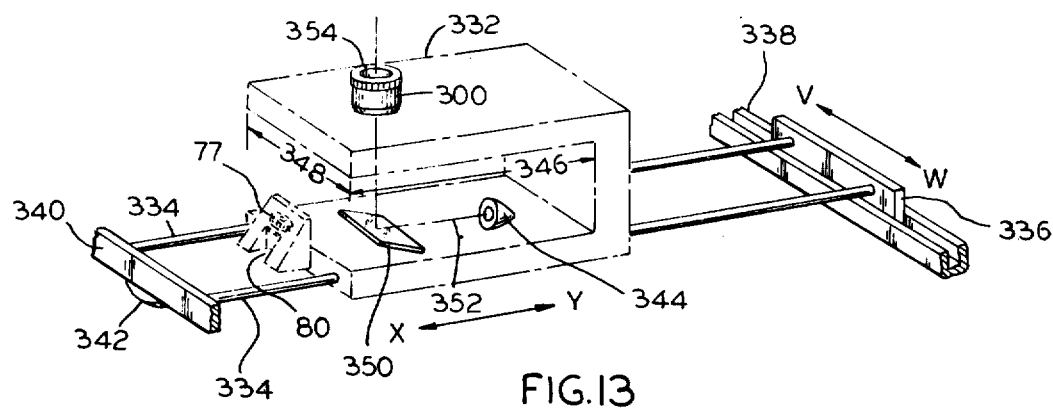
FIG.13
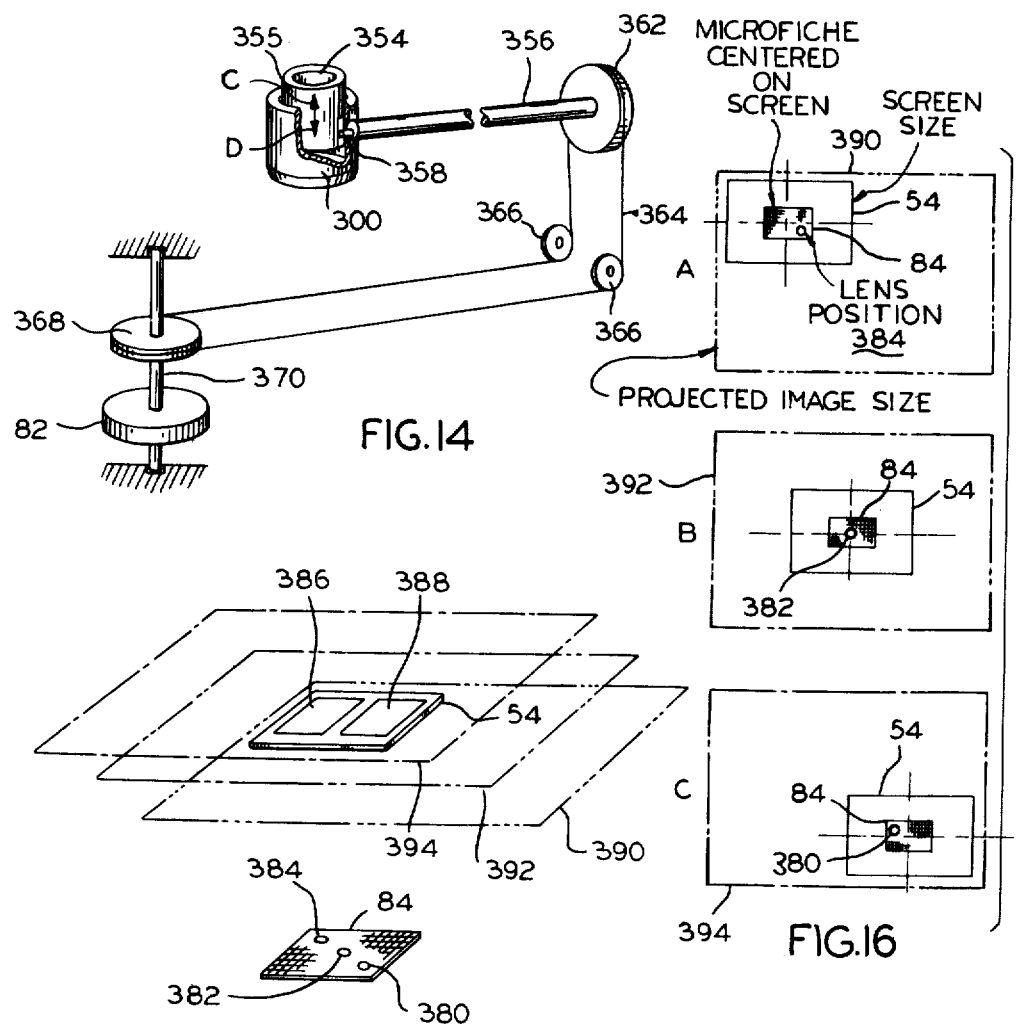
FIG.14
FIG.15
FIG.16

ELECTRONICALLY CONTROLLED MICROFILM PHOTOGRAPHIC IMAGE UTILIZATION DEVICE

This is a division of application Ser. No. 711,180, filed Aug. 3, 1976, now U.S. Pat. No. 4,110,020.

This invention relates to microfilm photographic image utilization devices and more particularly to photographic image utilization devices adapted to transport a roll of film having a plurality of microfiche printed thereon.

The term "photographic image utilization device" is used herein to mean any kind of equipment which is able to use the images that may be selected and projected by the inventive structure. For example, this equipment might be a mirofilm projector, reader, printer, or the like.

A microfiche is a well known photographic device wherein a plurality of images are conventionally microphotocopies in an orthogonal array on a small sheet film. Usually, the film is somewhat in the nature of a file card, such as approximately 105 mm.×148 mm. Conventionally, an operator holds, handles or moves these cards, on an individual basis. Therefore, they may become lost, damaged, destroyed, or refiled out of order.

Sometimes, microfiche contain information which must be continuously updated as the recorded information becomes obsolete or is superseded. If a large file of microfiche must be updated on a continuous basis, a substantial amount of time and labor is required, and filing mistakes are often made. Moreover, there are costs in copying and manipulating individual sheets of film which are not incurred when copying or manipulating rolls of film.

Yet another problem centers about control over a microfiche file. There are many times and conditions when a company, for example, wishes to issue a new edition of microfiche with an assurance that it will be properly filed and used by employees at many widely scattered points. Also, the company would want to preclude unauthorized removal of individual microfiche from a company file. There may be confidential information on some of the microfiche and the company may want to have it readily available for copying.

Still another consideration is existing customer habits. For example, a service or repairman conventionally has a number of very large books containing pictures of assemblies and long listings of parts. If these books are reproduced on microfiche, the arrangement of the microfiche should be such that the service or repairman may follow substantially his existing habit patterns, when using his books.

Accordingly an object of the invention is to provide new and improved microfilm photographic image utilization devices. Here an object is to provide photographic image utilization devices which do not require and, in fact prevent, the user from manually handling any individual microfiche.

Still another object of the invention is to provide microfilm photographic image utilization devices which are sturdy, foolproof, and yet of such low cost that they may be distributed to widely scattered points, even where the microfilm usage at any given point is relatively little.

Yet another object of the invention is to enable a ready printing, call up, and display of large catalogs on compact microfilm rolls of film. Here, a specific object is to provide parts lists for service or repairmen or for centralized parts centers. Thus, an object is to provide microfilm photographic image utilization devices which will function well, even in the hostile (relative to photographic equipment) environments, such as a garage, for example.

In keeping with an aspect of the invention, these and other objects are accomplished by a microfilm photographic image utilization device in which all images are printed on a roll of film. The photographic image utilization device has an automatic call up feature so that any given photographic area may be selected and projected responsive to the push of a button or the operation of another suitable switch. A microprocessor provides the logic for an automatic control of the movement of a film transport mechanism to position a selected photographic area in a viewing area where it is held stationary, while a lens is moved to project a selected image on that photographic area. A manual back up system enables user access to information recorded on the film, even after a malfunction of the selection system.

A preferred embodiment of such a photographic image utilization device is shown on the attached drawings wherein:

FIG. 1 is a perspective view of a roll film microfilm photographic image utilization device incorporating the principles of the invention;

FIG. 2 is a schematic layout of a strip of roll film, having a plurality of photographic areas, each with an orthogonal array of images recorded thereon with a special bar code printed along an edge of the film and located near the photographic area which it identifies;

FIG. 3 shows an exemplary bar code used to identify each photographic area on the roll;

Figure 5:
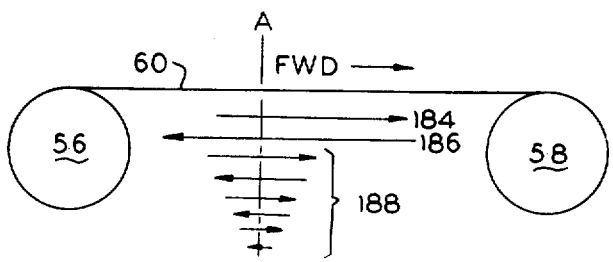
Figure 6:
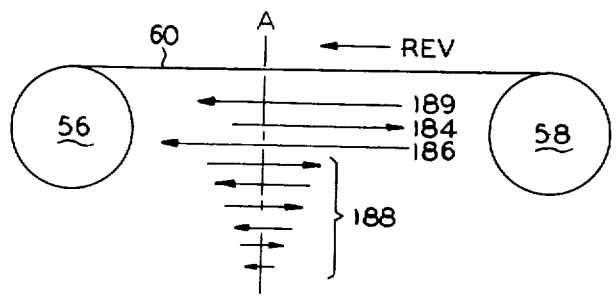
Figure 7:
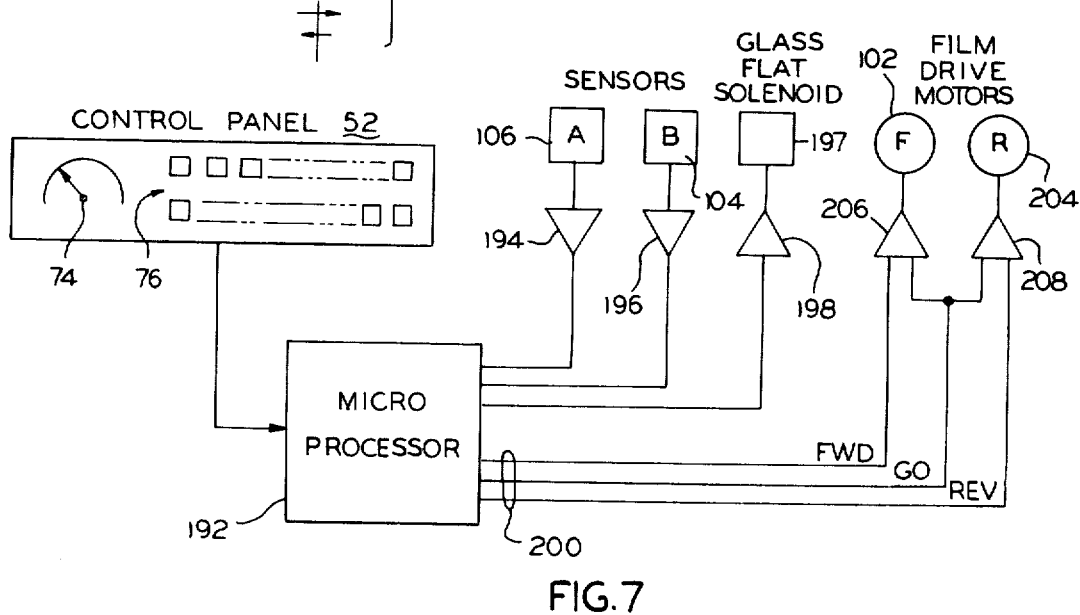
Figure 8:
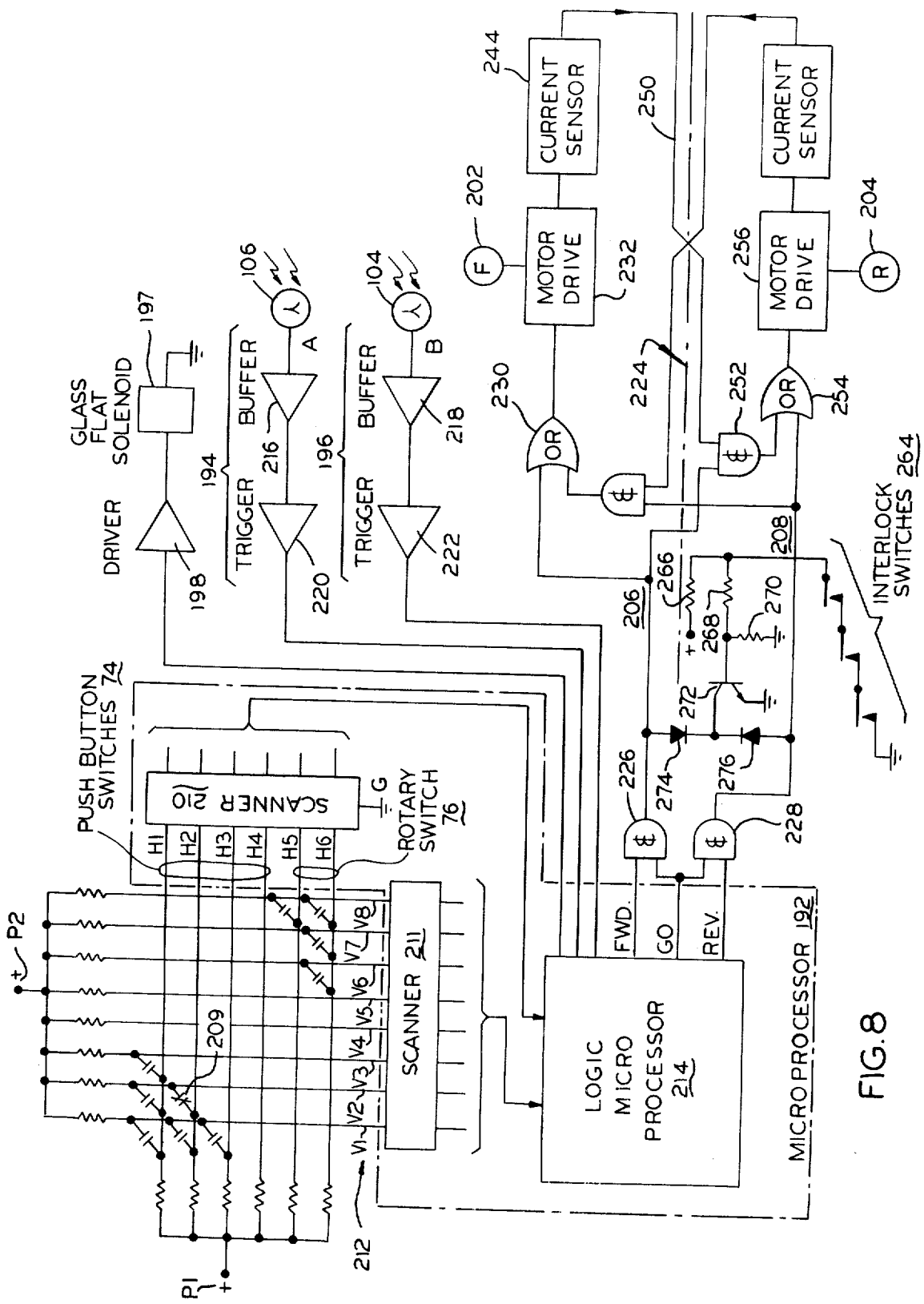
Figure 9:
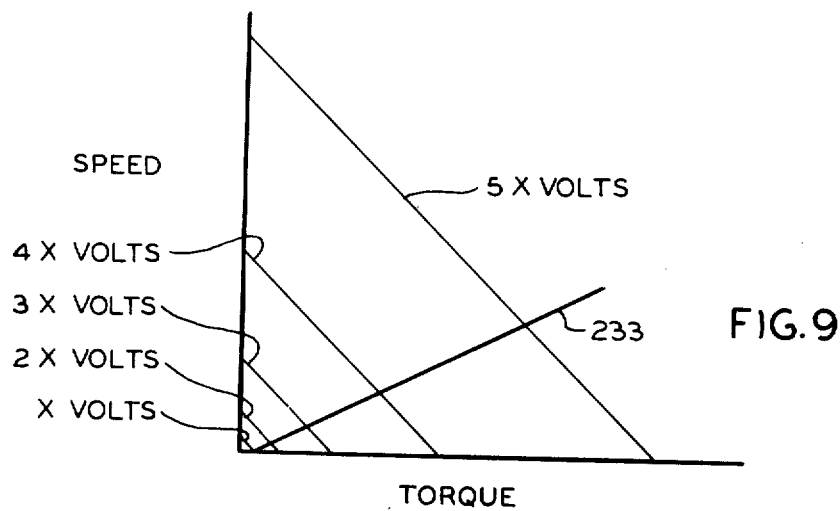
Figure 10:
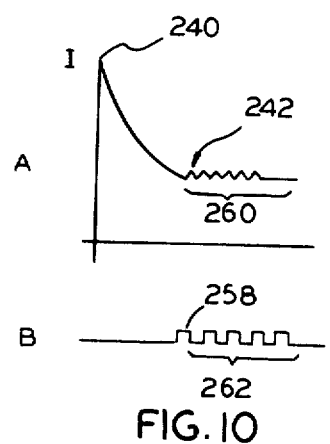
Figure 12:
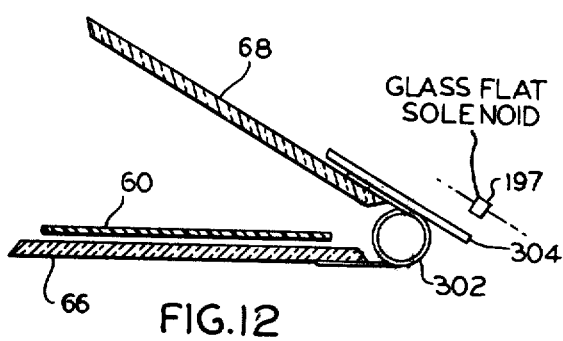
Figure 11:
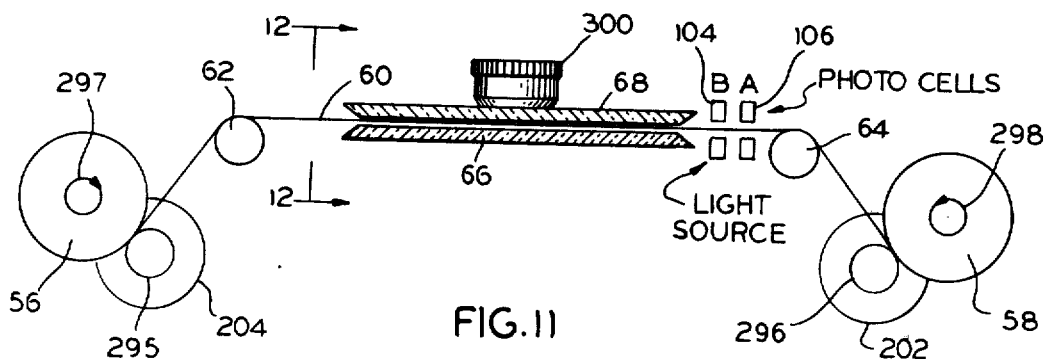

FIGS. 5 and 6 graphically represent a preprogrammed sequence of transport movement as the film is driven, reeled, and then brought to a stop;

FIG. 7 is a block diagram of an electronic system for controlling the microfilm photographic image utilization device of FIG. 1;

FIG. 8 is a logic diagram of a control circuit used to complete the block diagram of FIG. 7;

FIG. 9 is a speed vs. torque graph which illustrates how the film is brought up to speed without loss of tension;

FIG. 10 is a graph which helps to illustrate how a tension is maintained in the film;

FIG. 11 schematically represents and explains how the roll of film is transported;

FIG. 12 is a side elevation view, taken along line 12—12 of FIG. 11, for explaining how the film moves between a pair of glass flats;

FIG. 13 is a perspective view of a lens mount and light source support mechanism for selecting and displaying any image on a given photographic area;

FIG. 14 illustrates a lens focusing device used on the mechanism on FIG. 13;

FIG. 15 graphically and schematically illustrates how any given image on a photographic area is projected onto a photographic image utilization device screen; and FIG. 16 is a series of three graphical presentations which further illustrate how the images of FIG. 15 are projected onto the photographic image utilization device screen.

Briefly, the photographic image utilization device comprises a hood 50, a film transport mechanism 51, and a control panel 52. The hood 50 includes a rear illuminated screen 54, in front of a cavity large enough to sustain a beam of light which contains the projected microfilm image.

The transport mechanism includes a supply (relative to forward film transport) roll or reel 56, a take up roll or reel 58 and a web, here shown in the form of a length of film 60 extending therebetween. Preferably the reels 56, 58 have spools, hubs, or film cores with as large a diameter as possible so that there will be a minimum of internal working within the film itself. Any suitable number of guide rollers may also be provided (as shown at 62, 64) to convey the web or film 60 smoothly and evenly through the photographic image utilization device. As the web or film travels between rollers 62, 64, it passes between two flat glass plates 66, 68 (usually called "glass flats") which are closely spaced to hold the film, and therefore the microfilm images, at a precisely positioned, vertically oriented location relative to the lens systems (not seen in FIG. 1).

In order to load a web or strip, such as film 60, into the photographic image utilization device of FIG. 1, the web or strip is pulled from the hub, reel, or core 56, passed between the glass flats 66, 68 and attached to the hub, reel or core 58. The hubs, reels, or film cores are internally keyed so that they will not fit over spindles located in the cavities 70, 72, unless they are properly positioned and the web, strip or film is properly oriented.

Cover plates (not shown) may be provided to prevent accidental removal of the film and to prevent entry of dirt or other foreign matter into the cavities 70, 72. For security, these cover plates may be protected by a lock and key.

The control panel 52 includes a photographic area selector in the form of a plurality of push buttons 74 and a rotary switch 76. The rotary switch may be turned to select a book and the push buttons may be operated to select a chapter in that book. In the example of a large service parts center, the book might be "lawn mowers" and the chapter might be "engines". Therefore, the switches 76, 74 may be marked directly with these words. This way, the service or repairman using the photographic image utilization device may follow his customary procedures of selecting book and chapter, which procedures he conventionally followed before he received the microfilm.

Any other additional control, such as switch 75, may be provided to switch the photographic image utilization device or lamp off/on or to cause any other suitable functions.

Once the photographic area representing the first selective dimension (a book and chapter) has been automatically delivered to a reading or viewing position, it remains stationary. The operator grasps a handle 77 and moves it in second and third dimensions over an index printed on plate 78. When handle 77 reaches a selected point, a desired index on the plate 78 appears in a window 80 associated with handle 77, and a corresponding page or image on a photographic area on film 60 is projected onto the photographic image utilization device screen 54.

A special "plus one" push button 81 is provided to extend the chapter by advancing the film transport to display the next photographic area, when a chapter contains more than one of such areas. When the film reaches the last photographic area in a chapter, the roll of film automatically rewinds to again present the first photographic area in the selected chapter, if the "plus one" button 81 is again pushed.

A thumb wheel 82 on handle 77 may be turned to focus the image projected onto the screen 54.

FIG. 2 shows a small section of film 60 and illustrates how the photographic areas are arranged thereon. In greater detail, each photographic area (85, for example) may have any convenient length "L" and a width "W", approximately equal to the width of the film, with suitable allowance for margins. Each photographic area includes a number of individual images (one of which is outlined at 86 for easy identification). The images on the photographic area are arranged in an orthogonal layout. A suitable index or table of contents may be provided near one edge of each photographic area, as indicated by cross hatching at 88.

The drawing has been marked at 90, by way of example to indicate that the images on photographic area 87 are "Book 6, Chapter 9", which is also indicated by the bar code 92. The letter "A" on photographic area 85 implies that chapter 9 is so large that it extends over a plurality of photographic areas. The user realizes that he must go on to another photographic area and he pushes the special "plus one" push button 81 (FIG. 1) to cause the photographic image utilization device to advance from photographic area 87 to photographic area 85, where a special single mark bar code 89 is encountered. If the "plus one" push button 81 is pushed again, the transport advances a second time, looking for another single mark bar code. This time, however, a standard bar code 91 is found. Therefore, the second operation of the "plus one" push button 81 causes the film to briefly rewind and to again display the initial photographic area 87 in Chapter 9. This "plus one" process of advancing to the next photographic area, one at a time, may be repeated as often as required.

A series of bar codes (such as 89, 92, 91) is printed along one margin of the film and precisely located at the same relative positions near each photographic area. Therefore, if the bar code 92, for example, is precisely positioned by the film transport mechanism so that a sensor is at one edge, such as 93, of the code 92, the photographic area 84 is precisely located in the viewing area or in the optical path of the photographic image utilization device.

The nature and function of the bar code is shown in FIG. 3. There are a number (here nine) of spots or marks arranged in a series. Each binary "1" is a wide spot or mark, as at 98, and each "0" is a narrow spot or mark, as at 100. Each wide spot 98 is exactly twice as wide as a narrow spot 100. A pair of sensors or transducers 104, 106 are positioned adjacent the edge of film 60 to read the bar code as the film passes adjacent them. For example, if the spots or marks 98, 100 are dark areas recorded on transparent film (or transparent marks on dark film), the sensor or transducers 104, 106 may include ligh sources on one side of the film and photocells on the other side of the film. The width of the space 107 between each spot or mark is exactly the same as the width of a narrow spot 100. The sensor or transducers 104, 106 are separated by a distance 108 which is exactly equal to 1.5 times the width of a narrow spot or mark 100.

According to the invention, it is totally irrelevant whether the film travels from left to right or from right to left. Neither direction is preferred. However, it is convenient to have an expression for distinguishing between these two directions. Therefore, one direction is arbitrarily called "forward" and the other "reverse". This same arbitrary terminology is used to identify "forward" and "reverse" motors which drive the film in those respective directions.

It should be noted that B sensor or transducer 104 encounters the bar code 92 before the A sensor or transducer 106 encounters it, when the film travels in a forward direction. The A sensor encounters the bar code first when the film travels in the reverse direction. There is no problem, however, since the A sensor drives into one side of a shift register and the B sensor drives into the other side of that same shift register. The same output conductors are marked by the shift register regardless of which way it is driven.

Figure 4:
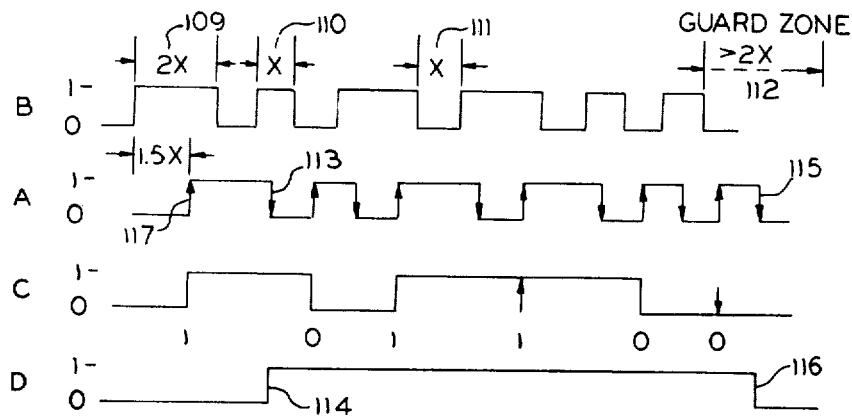
FIG. 4 is a graphical representation of how the bar code is read.

FIG. 4 graphically shows how the outputs of the sensors or transducers are interpreted by the associated electronic control circuits. (There is no correlation between the codes of FIGS. 3, 4.) The sensor output pulse 109 is wide, responsive to a wide spot or mark. A narrow spot or mark 100, produces a narrow pulse 110, and a space 107 between spots or marks are indicated by narrow spaces 111 between pulses. The relative widths of the pulses and spaces, and of the distance between the sensors or transducers are indicated in FIG. 4 by "X", "2X" and "1.5X". Each bar code has a guard zone 112 on one end, in which zone another bar code is forbidden. At any distance beyond the end of this guard zone which is greater than 2X (i.e., more than a wide spot or mark), a new bar code may begin. Therefore, a photographic area does not have to have a fixed and standard length. There is no need for a guard zone on the other end of the bar code because that space is protected by the next adjacent bar code.

The output of sensor or transducer B is shown by curve B of FIG. 4 and the output of sensor or transducer A is shown by curve A. Note that the output A is the same as the output B, except that there is a lag of 1.5 X between the two outputs. If the direction of film travel is reversed, the pulses in curve B will lag after those in curve A, because the sensor A encounters the bar code before sensor B encounters it in reverse film travel.

The sensor or transducer having the lagging output functions as a clock or strobe for reading the leading transducer. This way, it is not necessary for a clock to maintain a precise synchronization between the film transport and the code photographic image utilization device. In greater detail, curve A has been marked with arrow heads to indicate whether the transitions in the output of sensor or transducer A are going positive or going negative. In this example, the associated logic circuitry is arranged to read the output of the B sensor or transducer, each time that the transition in the output of the A sensor or transducer is going positive, as at 117, for example. Curve B is marked at the left-hand end to indicate the voltage levels representing a "1" and a "0".

By inspection, it will be seen that curve C represents the state of the output of the B sensor or transducer, at the instances when the positive going transitions occur in the output of the A sensor or transducer. Thus, the logic circuitry "sees" the binary word "101100", as indicated by Arabic numerals below curve C. By recalling that each wide pulse in curve B is a binary "1" and that each narrow pulse is a binary "0", it is apparent from an inspection of FIG. 4 that the code originally read by the B sensor or transducer has been correctly interpreted by the logic circuitry.

The start and stop of a bar code is represented by curve D and controlled by the negative going transitions in the output of the A sensor. The first negative going transition 113 in the output of the A sensor or transducer triggers a start of code detection, as indicated at 114 in curve D. As long as the bar code continues to be read from the film, the control circuitry counts and responds to negative going transitions, and curve D remains "high". After the negative going transition counter reaches a specific count, the sensors have read the last output in a bar code; therefore, on the negative going transition 115, which indicates an end of a bar code, the curve D goes from "high" to "low", as indicated at 116. The end of code signal 116 occurs on the sixth negative going transition (curve A) in FIG. 4 or the ninth transition in the code of FIG. 3. Since the number of spots or marks are the same in all bar codes, there is a parity check because the proper number of spots or marks must be registered at the time when curve D goes negative. (In the example here given, the parity check occurs when the circuit counts the correct number of down going transitions between edges 114, 116, inclusive).

The film is transported responsive to an operation of switches on control panel 52, to automatically select and display a desired photographic area. More particularly, FIGS. 5, 6 help explain how a roll of film is transported, in order to bring a selected photographic area into the viewing area in the photographic image utilization device of FIG. 1 responsive to a reading of the bar codes of FIGS. 2–4. FIG. 5 graphically shows film 60 traveling a forward direction and FIG. 6 shows the same film 60 traveling in a reverse direction.

At an instant when a read command is first received, the photographic image utilization device does not always known whether the requested image is on the left or the right of the viewing area since film 60 will be resting at its last stopping place. For example, the photographic image utilization device may lose its stored memory if power is interrupted or switched off. Therefore, if the memory of the last read bar code is stored, the photographic image utilization device may always start in the correct direction. But, if that memory has been lost, the photographic image utilization device starts in one preferred direction. One or more bar codes are read, and the electronic control circuit decides whether the film is or is not traveling in the correct direction. If it is, the film continues to so travel. If not, the film transport reverses direction.

In either direction of travel, it is always necessary for the film to stop at the same position relative to the bar code. For example, as FIGS. 2 and 3 are drawn, it is desirable for the film to always stop with the A sensor or transducer head 106 (FIG. 3) aligned with the left hand edge 93 of the bar code 92, regardless of whether the film travels in a forward or reverse direction.

FIG. 5 shows how the film is so stopped from the forward travel motion, 184. Initially, the film transport is commanded to travel at a high searching speed. When the control circuit first recognizes a bar code corresponding to its commanded code, the film transport may be traveling at a very high speed if it has been running long enough to get up to its maximum speed. Since the transport mechanism is a mechanical device with inertia, the film 60 may coast one or more bar codes beyond the desired photographic area. Therefore, when the transport does stop, it reverses direction 186, and thereafter travels at a slow speed. When the desired bar code is again recognized, the transport is stopped once more. At slow speed, inertia does not carry the transport as far as it does at high speed. However, the film may still coast by at least some discrete distance. Therefore, the transport mechanism reverses (188) direction a predetermined number of times (here up to six times) in a preprogrammed sequence, moving the film slightly less on each reversal, until the leading edge 93 of the bar code is precisely under the A sensor or transducer head 106. Accordingly, the edge 93 oscillates under sensor A in diminishing amounts of travel.

When the film is traveling in the reverse direction (FIG. 6), the control circuit again looks for a bar code corresponding to its command code. However, it would be expensive and awkward to require the homing to be performed in two different ways depending upon the direction of film travel during high speed searching. Therefore, once the bar code corresponding to the command code is encountered during high speed searching in the reverse direction 189, the transport mechanism first reverses its direction of travel without immediate effect and before the preprogrammed stopping sequence begins. This means that even on reverse direction searching, the film is traveling in forward direction 184 when the stopping sequence is initiated. Thereafter, the stopping sequence is the same as the sequence used in the forward direction.

The electronic control circuit is seen in FIGS. 7, 8. Briefly, the rotary and push-button switches 74, 76 (FIG. 7) send the command code signals into a microprocessor 192, which may be any of many commercially available products. While any of these products may be used, the invention currently employs the well known F8 microprocessor system components made by the Fairchild Camera & Instrument Corporation. The A,B sensors or transducers 106, 104 transmit the sensed signals (FIG. 4) into the microprocessor 192 via switching amplifiers 194, 196. The microprocessor energizes a glass flat solenoid 197 via a driver amplifier 198. The microprocessor controls the direction of film travel by selectively energizing "FWD", "GO" and "REV" wires 200. The "FWD" and "REV" wires are energized with a steady d.c. potential to select the direction of film transport travel. The "GO" wire is energized with either a steady d.c. potential to command the forward (F) and reverse (R) motors 202, 204 to turn at high speed or with an interrupted d.c. potential to command the motors to turn at a low speed. The actual low speed depends upon the percentage of a duty cycle during which the GO wire is marked with the interrupted d.c. potential. These command signals are fed to the motors 202, 204 via two individual driving amplifiers 206, 208, which are essentially "AND" gates.

Each of the motors 202, 204 is mechanically connected in any suitable manner to drive one of the associated film cores. Forward motor 202 drives the take up film core 58 (FIG. 1) and reverse motor 205 drives the supply film core 56.

FIG. 8 shows the logic diagram of an electronic control circuit which may be used to complete the block diagram of FIG. 7. The control switches 74, 76 are part of a matrix 212.

The matrix 212 comprises horizontal and vertical multiples defining a plurality of crosspoints. Each switch 74, 76 has a set of contacts connected across the matrix crosspoints. For example, one set of switch controlled crosspoint contacts, shown at 209, are here assumed to be the only ones closed by an operated push button 74. Of course, any other crosspoints could also be the closed ones.

Scanner 210, which may be part of the microprocessor, initially applied ground G to the upper most horizontal H1 in matrix 212. All other horizontals are marked with the positive potential P1. All verticals are marked with positive potential P2.

Scanner 211, which may also be part of the microprocessor, sequentially tests the potential on each vertical in matrix 212, and finds only potential P2 because the above assumption, in this description, has been that only crosspoints 209 are closed.

After scanner 211 completes one scan, the scanner 210 is operated to remove ground G from the uppermost horizontal H1 and to apply it to the next lower horizontal H2. The scanner 211 finds potential P2 on vertical V1. However, vertical V2 is connected through contacts 209, assumed to be closed, to ground G.

Immediately, the control circuit recognizes that it has found the closed push-button contact and scanner 210 is advanced in its cycle to apply ground G to horizontal H5. Again, the scanner 211 searches for a ground applied through a selected set of contacts on rotary switch. If the closed rotary switch contact is on horizontal H5, the control circuit stops the scanners. If not, scanner 210 is advanced to apply ground G to horizontal H6 and scanner 211 searches for it.

It should now be apparent that the matrix 212 enables the electronic circuitry to ascertain the commanded code responsive to a selective operation of a push button 74 and rotary switch 76.

The logic of the microprocessor 192 is represented at 214. For completeness FIG. 8 repeats the sensors or transducers 104, 106, glass flat solenoid 197 and amplifiers 194, 196, 198. Each of the sensor amplifiers 194, 196 include a buffer amplifier 216, 218 followed by individually associated trigger circuits 220, 222, preferably Schmitt triggers. This way, the logic circuitry 214 receive unambigeous sensor originated signals (FIG. 4) responsive to each detection of a bar code spot or mark.

The remainder of FIG. 8 shows a circuit for driving the film transport mechanism and for maintaining film tension. This portion of the figure is divided by a dot-dashed line 224, with the driving amplifier 206 shown above the line and driving amplifier 208 shown below the line. Since circuits 206, 208 are the same, only circuit 206 will be explained.

The forward FWD and reverse lines REV are connected to individually associated AND gates 226, 228. Thus, the AND gate 226 conducts when the microprocessor 192 energized the FWD and GO wires. The AND gate 228 conducts when the microprocessor energizes the REV and GO wires.

The output of AND gate 226 is fed into an OR gate 230 which energizes a motor drive circuit 232. The motor drive circuit supplies a d.c. voltage to forward motor 202. If the motor 202 is in the fast drive mode, there is a steady state d.c. potential. The microprocessor 192 energizes the GO wire continuously and without interruption. Drive circuit 232 then applies a maximum d.c. power to the motor 202, which runs at high speed.

When the desired bar code is detected, the motor 202 is stopped. The microprocessor signal for stopping the motor is a simultaneous energization of the FWD, REV and GO wires, so that the two motors pull against each other. The potential on the GO wire is interrupted, first slowly and then at a progressively faster rate. After the frequency of interruptions passes a critical high frequency rate, the system can no longer follow the interruptions and the motors stop with the initially undriven motor acting as a drag upon the film to maintain film tension and help stop the driven motor.

If the motor 202 is then driven in a slow drive mode, there is a problem since frictional forces may vary from time to time. for the same slow speed, the amount of energy supplied at any given time may vary from the amount that must be supplied at any other time. Accordingly, when the combination of signals sent from the microprosessor logic 214 over the FWD and GO leads to motor drive circuit 232 indicates a slow speed, the motor drive circuit 232 preferably applies energy to the motor in the manner indicated by FIG. 9, wherein speed is shown on a vertical scale and torque on a horizontal scale. Initially, a very low voltage is applied to forward motor 202 at a potential which is here arbitrarily designated "X". If the motor does not turn, the potential is gradually doubled to "2X". If it still does not turn, the voltage is increased to "3X", etc. Eventually, the motor begins to turn.

In order to so increase the potential applied to the motor 202, the slow speed indicating intermittent interruptions on the GO wire begin as narrow pulses which are gradually made wider, with a rising ramp front characteristics. As the GO wire is energized during progressively longer periods in the interruption duty cycle, the motor 202 runs at progressively faster (but still relatively slow) speeds. Hence, as soon as the instantaneous friction is overcome in the motor, it starts slowly and thereafter builds speed, with the acceleration characteristics depicted by line 233 in the graph of FIG. 9.

Whenever either motor (the driven motor) is operating to pull the film, the other motor (the undriven motor) is energized with a weak current. The undriven motor supplies only enough torque to act as a drag and thereby maintain film tension. The control of this drag is extremely important since it maintains a uniform film tension. Otherwise, the turns of film on a reel might alternately loosen and cinch, and therefore, damage the film. Accordingly, there is a need for the microprocessor to precisely control the current supplied to the undriven motor.

FIG. 10 explains how the current supplied to the undriven motor is controlled and regulated to maintain a predetermined film tension. In greater detail, when the motor is first energized, it draws current which shoots up from a zero axis to the point 240, FIG. 10A. As the motor beings turning, the current falls off, with some decaying characteristics, as indicated between the points 240, 242.

Current sensor 244 is a trigger circuit connected to the output of the motor drive circuit 232 to detect current drawn by the motor, as depicted in FIG. 10A. The sensor 244 detects when the current falls to the point 242, and thereupon sends a signal over wire 250 to AND gate 252. The other input of AND gate 252 is already energized via the FWD wire and the output of AND gate 226. Thus, when the forward motor 202 is operating, AND gate 252 applies a signal through OR gate 254 to motor drive circuit 256 and reverse motor 204.

Upon energization, reverse motor 204 acts as a drag upon film 60 and therefore upon forward motor 202, which must then draw more current from the motor drive source 232. Current sensor 244 uses a trigger circuit which switches OFF when there is an increase of current in the motor 202. The current to reverse motor 204 is removed. Thus, the motor drive circuit 256 has received a pulse of driving current, as indicated by pulse 258 (FIG. 10B). A deenergization of the reverse motor 204 reduces the drag upon film 60 and forward motor 204, and the cycle repeats.

The motor drive circuit may also operate on an analog basis, if desired.

An advantage of the above-described invention is that the transport is completely free of brakes, clutches, and the like, which are notorious sources of trouble. More particularly, the film 60 follows the path from reel or core 56, over rollers 62, 64 to reel or core 58. Motor 202 drives the film 60 in a forward direction and motor 204 then receives a very light current so that it acts as a drag or brake upon the film. Likewise, motor 204 drives the film in an opposite or reverse direction, at which time motor 202 receives a light current so that it acts as a drag or a brake. This way, one motor always acts to maintain film tension while performing the clutch and braking functions.

Hence, as long as the driven forward motor 202 continues running (Curve A, FIG. 10), its energizing current fluctuates while motor 202 hunts for its correct speed, as shown at 260. The undriven reverse motor 204 is pulsed, as shown at 262, responsive to current fluctuations 260. Thus, the undriven motor receives a low level d.c. energy, which is an integration of and derived from an average of the pulses 262. This low level of current causes the reverse motor 204 to resist turning and thereby maintains a steady tension upon the film 60.

Between the outputs of AND gates 226, 228 there is an interlock circuit designed to keep the motors from being driven at any time when the mechanical parts of the photographic image utilization device are not in a condition for the film to travel safely. In greater detail, a plurality of any suitable mechanical switches 264 are connected in series between ground and a voltage divider comprising resistors 266, 268, 270. These switches 264 may be "Microswitches" actuated by mechanical photographic image utilization device parts, such as the movable glass flat 68, film reels 56, 58 or any other mechanical parts, all of which should be in a normal condition before the film may be safely transported. If all of the switches 264 are properly closed, ground is applied to the base of transistor 272, which switches off. Thereafter, the outputs of AND gates 226, 228 may be effective upon the motors 202, 204. However, if one or more of the interlock switches 264 is opened, the potential set by voltage divider 266, 268, 270 establishes a base bias which switches on the transistor 272, to apply ground to a junction between diodes 274, 276, which are connected to the outputs of AND gates 226, 228, respectively. Thereafter, the outputs of "AND" gates 226, 228 are clamped to ground, and the motors 202, 204 cannot be commanded to operate.

When the electronic control circuit of FIG. 8 finally stops the film, a desired microfiche is accurately positioned in a viewing position between the glass flats 66, 68 (FIG. 11). More particularly, the bar code reading head sensors or transducers 104, 106 are located at any convenient point along the travel path for film 60. FIG. 11 shows the A, B sensors 106, 104, respectively, at a location near the right-hand end of glass flats 66, 68. For example, if the bar code 92 (FIG. 2) is printed at a proper position on the film 60, photographic area 87 is precisely positioned between glass flats 66, 68, when one edge 93 (FIG. 2) of the bar code is directly under one of the sensors (here assumed to be A sensor 106). Preferably, each sensor comprises a light source beneath the film, and a matching photocell above the film. Of course, the projector light source of the reader is also below the film; therefore, the sensors might also be simple photocells positioned above the film. Also, this arrangement of sensor locations may be changed, in any convenient manner. FIG. 11 shows the glass flats 66, 68 in a closed or reading position. In this position, a lens holder 300 floats loosely on the top of the upper glass flat 68. However, the film 60 might be scratched if it is pulled between the flats while they are clamped shut, and it is desirable to open the flats during film transport. Any suitable means (not shown) automatically moves the lens holder 300 from the reading position on top of the movable glass flat 68, either before or as it opens.

Means are provided for manually selecting the desired photographic area. In greater detail, as here shown, the film core 56 is normally driven by motor 204, acting through a set of reducing gears 295. The film core 58 is normally driven by motor 202, acting through its set of reducing gears 296. This way, the film may be driven in either direction, by a suitable energization of one of the motors. Film tension is maintained by a low level of current energizing the other motor. If there is a need to override the motors or to operate the reader without the motor assist, each film core 56, 58 has a one way clutch 297, 298 individually associated therewith. If clutch 297 is turned by hand in the direction indicated by the arrowhead, film is pulled from film core 58 and wound upon the film core 56. The one way action of clutch 297 prevents the user from turning the film core in the wrong direction and thereby loosening film tension. Also, a resistance to turning is naturally supplied by the unenergized motor 202, gear reduction 296 and other mechanical parts, in order to supply film tension. Likewise, if clutch 298 is turned by hand, film is pulled from core 56 and wound upon core 58, with film tension maintained in a similar manner.

As seen in FIG. 12, the upper glass flat 68 is spring biased at 302 to a normally open position. When it is time to read or project an image, a glass flat solenoid 197 is energized to attract an armature 304, and thereby close the movable glass flat 68 against the lower or fixed flat 66. Of course, the movable glass flat 68 could also be normally spring biased to a closed position and opened by the solenoid 197. The normally open position shown in FIG. 12 is preferred because it tends to save current, is more fail-safe because film is less likely to be pulled through closed flats, and because it is easier to load the film into the reader if the glass flats are normally standing open.

FIG. 13 shows the mechanical structure which is used to select and project the photographic area image which is to be displayed. This image selecting mechanism comprises a yoke 332 mounted on a transport mechanism comprising a pair of horizontal bars 334 and sliding block 336. The sliding block rides in any suitable channel 338 which is rigidly attached to the reader of FIG. 1, to slide back and forth in directions V and W. For example, the slide may be somewhat similar to the slides conventionally used to mount file cabinet drawers.

At one end, each of the two bars 334 are rigidly mounted in and move with the block 336 and as it travels back and forth in the V-W directions. The opposite ends of bars 334 are rigidly attached to a block 340 which freely rests, under gravity, on the index plate 78 (FIG. 1) of the reader. A small foot or glider 342 is formed on the bottom of block 340 so that it slides with little friction in directions V-W.

The yolk 332 slides freely, in directions X-Y, along the length of the two bars 334. Therefore, if the handle 77 and therefore the yolk 332 is moved, an indexing mechanism (window 80) may be moved to any selected place on the index plate 78. This movement places lens holder 300 directly over the selected image.

It should be noted that one form of lens transport structure 338, 339 enables the lens-scanning and projecting system to scan in one (V-W) direction and that another form of lens transport structure 334 enables the lens system to scan in a perpendicular direction (X-Y). Thus, the lens may be moved over an area to any point in a plane defined by these two perpendicular directions. It is almost impossible for two such different transparent structures, which are isolated from each other, to present the same frictional forces to resist movement of the assembly. For example, the foregoing description has indicated that the slide 336 is similar to a file cabinet slide mount, which is a low friction mount, while yoke 332 is merely described as sliding along two bars. Hence, it is apparent that there will almost certainly be less friction in the V-W direction than in the X-Y; however, the specific direction of less friction is not important.

The important thing is that the lens transport system prefers to move in one direction as compared to the other. Therefore, the lens mount may be placed over a selected row, and then, a light touch upon handle 77 causes the lens mount to scan over all images in the selected row. Or, if the frictional forces are reversed, the light touch causes the lens mount to scan over all images in the selected column. This way, the lens transport system tends to follow a more predictable path along a given line and not to meander across the scanned photographic area. Hence, it is much easier to find one image, from among an orthogonal array of images, where the inventive lens-transporting system is used.

Another of the advantages of this inventive lens transport system is that the image moves across the screen in the same direction that the lens holder 300 moves. Therefore, a person holding handle 77 may move his hand in the same direction that he wants the picture to move. Hence, the image selection movement is an instinctive and reflex type of operation. This is in contrast to many optical systems wherein the image is inverted or reversed. In those systems, a person must pull his hand in, say, an "8 o'clock" direction in order to make the image move in a "2 o'clock" direction.

The yolk 332 has an opening 346, 347 for receiving both the glass flats 66, 68 and the film 60. Neither the film nor the glass flats touch the yolk 332, itself. A light source 344 is positioned beneath the opening 346, 347. In front of the light source 344 is a mirror 350 which is set at a 45° angle, with respect to the X-Y direction. Therefore, a horizontal beam of light 352, from source 344, is reflected at a right angle to pass vertically through the film and a lens 354, in lens holder mount 300. Accordingly, it should be clear that the lens 354 may be placed over and the light source mirror 350 may be placed under any selected image on the photographic area clamped between the glass flats. This way, any image on the photographic area may be projected toward screen 54, along the optical path represented by the double dot-dashed line 352. Any suitable additional mirrors may also be included to fold the optical path, as may be required, in order to fit it within the hood 50 (FIG. 1). Of course, the mirror 350 may be removed if the light source 344 is aimed directly toward the lens 354. An advantage of the mirror is that it may be a special coating to separate the heat from the light.

The yoke 332 is constructed to enable the lens holder 300 to float loosely and freely, directly upon the upper surface of the glass flat 68. By resting directly upon the glass, the lens holder is always positioned exactly the same distance away from the microfilm. Inside the lens holder 300 is a telescoping lens mount 355 which may be moved up or down in order to focus the image of the photographic area upon the screen 54.

The mechanism for focusing the lens is shown in FIG. 14. More specifically, the lens holder 300 is vertically oriented and the lens mount 355 arranged for telescoping motion within the holder. Adjacent the lens mount 355 is a rotatably mounted horizontal shaft 356 having an eccentric elongation or cam 358 integrally formed thereon. The cam engages the telescoping lens mount 355. Therefore, as the shaft 356 rotates, the lens mount 355 moves, within the lens holder 300, up or down in directions C-D.

A pulley wheel 362 is rigidly attached to the end of shaft 356, to rotate the shaft, as the pulley wheel turns. A dial cord 364 is trained over the pulley 362, two idler wheels 366, 366 and a horizontally oriented pulley wheel 368. The thumb wheel 82 (FIG. 1) is mounted on and turns with the same shaft 370 that carries the pulley wheel 368. Therefore, as the thumb wheel 82 is rotated, the pulley 368 turns, to pull the dial cord 364. The cord 364 turns pulley 362 to rotate shaft 356 and raise or lower the lens mount 355. This entire focusing mechanism (FIG. 14) is mounted on and carried by the yolk 332 (FIG. 13). Therefore, the focusing mechanism moves with the yolk, responsive to manipulation of the handle 77. Also, the shaft 356 may be adapted to swivel about the axis of the idler wheels 366, 366 so that the lens holder may raise or lower as the upper glass flat 68 raises or lowers.

The principle of the image selection is graphically illustrated in FIGS. 15, 16. The microfiche 84 is positioned under the yolk and the lens, here graphically represented in three positions 380, 382, 384. The screen 54 is placed over the lens either with or without optical path folding mirrors therebetween. The magnification of the lens is such that two images 386, 388 fill the entire screen 54.

If the yolk and, therefore, the lens is moved to position 380, the image projected on screen 54 is oriented as shown by the three dot-dashed line 390. Thus, for example, an image in the lower right-hand corner (as viewed in FIGS. 15, 16) is placed upon the screen 54. The remainder of the projected image 390 is lost inside the hood 50. If the yolk and lens are moved to position 382, the projected image on the microfilm is also moved to the position shown by the double dot-dashed line 392. This time the two individual images 386, 388, falling on screen 54, are taken from near the center of the photographic area 84. Likewise, if the yolk and the lens are moved to position 384, the projected image on the microfilm is shifted to the position shown by the single dot-dashed line 394. This time the two individual images 386, 388 falling on screen 54 are taken from the upper left-hand corner of the photographic area 84.

Again, all projected images, except those falling on screen 54, are lost inside the hood and are not seen by the viewer.

Those who are skilled in the art will readily perceive how the invention may be modified. Therefore, the appended claims are to be constructed to cover all equivalent structures.

The invention claimed is:

1. A microfilm photographic image utilization device for projecting a large library of images onto a viewing area responsive to a three-dimensional selection process, said device comprising a roll of film wound on first and second reels and carrying said large library of images, means for transporting said roll of film in either of two directions from one of said reels to the other of said reels, said film having a plurality of images printed thereon in individually identified discrete photographic areas, each of said photographic areas having an individually associated bar code address printed on the film, each of said bar codes comprising an aligned series of wide and narrow marks separated by spaces, each narrow mark having the same width, each of said wide marks being twice as wide as said narrow marks, the width of each of said spaces being equal to the width of said narrow marks, the individual area identification addresses given by said bar codes constituting an index for a first selective dimension, each photographic area having a plurality of individual images arranged in an orthogonal array, the X and Y axes of said orthogonal array constituting second and third selective dimensions, means responsive to detection of a selected bar code identification of any one of the individual area identifications for automatically driving said transport to reel said film in either of said two directions to position any selected one of said photographic areas during a first dimensional selection in a reading location in said large library, and manually movable means comprising a movable lens which is thereafter moved in X and Y dimensions in a manual search mode for projecting a selected image from the photographic area which is then positioned within said viewing area, said lens having an angle which is wide enough to project an image from a most remote part of the photographic area onto said viewing area.

2. The device of claim 1 and control means for giving an address in said one dimension for selecting said one photographic area responsive to movement of at least one control switch to issue a command code, said control switch being identified by the subject matter of the image.

3. The device of claim 2 and means responsive to said command code for starting said transport means from any point on said film in search of one of said bar code addresses corresponding to said addressing command code, means for detecting whether said transport means is searching in the correct one of said two directions for said one bar code, and means for reversing said transport means if said transport means detects bar codes which indicate that searching is in the incorrect one of said two directions.

4. The device of claim 3 and means for stopping said transport means responsive to a detection of a bar code address of said one dimension of movement with a preprogrammed sequence consisting of a predetermined number of diminishing oscillatory mechanical movements, said film stopping with a selected bar code address in a predetermined stopping position.

5. The device of claim 1 wherein said transport means may move at either a high searching speed or a slow positioning speed under the control of a central controller means, and means for stopping said transport means under the control of said central controller means responsive to a detection of the desired first dimensional address of said selected one photographic area in said reading location, said stopping means comprising means for stopping said transport means while it is being driven at said high searching speed in one of said two directions, means responsive thereto for thereafter driving said transport means in an opposite direction at said slow positioning speed, and means for thereafter initiating a preprogrammed sequence under the control of said central controller for repeatedly reversing the direction of said transport means a predetermined number of times during said programmed sequence for bringing said film to a stop with said first dimensional address at an exact position with a diminishing oscillatory motion.

6. The device of claim 1 wherein said film transporting means is normally operated by a central controller means and manually controlled one-way clutch means for overriding said central controller means operation of said automatic reeling means by enabling the roll of film to be rolled independently of the transporting means in order to position the film at a manually selected position.

7. The device of claim 1 wherein said movable lens comprises yoke means movable over said orthogonal array of images while one of said photographic areas is in said viewing area and said lens means is mounted in said yoke for projecting at least one of the images under said lens at the instantaneous position where said yoke is located.

8. The device of claim 1 and manually controlled means for moving said lens over a random path.

9. A microfilm photographic image utilization device for projecting a large library of images onto a viewing area responsive to a three-dimensional selection process, said device comprising a roll of film wound on first and second reels and carrying said large library of images, means for transporting said roll of film in either of two directions from one of said reels to the other of said reels, said film having a plurality of images printed thereon in individually identified discrete photographic areas, the individual area identifications constituting in index for a first selective dimension, each photographic area having a plurality of individual images arranged in an orthogonal array, the X and Y axes of said orthogonal array constituting second and third selective dimensions, means responsive to detection of a selected identification of any one of the individual area identifications for automatically driving said transport to reel said film in either of said two directions to position any selected one of said photographic areas during a first dimensional selection in a reading location in said large library, manually movable means comprising a movable lens which is thereafter moved in X and Y dimensions in a manual search mode for projecting a selected image from the photographic area which is then positioned within said viewing area, said lens having an angle which is wide enough to project an image from a most remote part of the photographic area onto said viewing area, said movable lens further comprising yoke means movable over said orthogonal array of images while one of said photographic areas is in said viewing area, said lens means being mounted in said yoke for projecting at least one of the images under said lens at the instantaneous position where said yoke is located, one-hand control handle means connected to said yoke means, whereby said lens mounted on said control handle means is moved responsive to a manipulation of said one-hand control handle means, and means mounted on and movable with said one-handed control handle means for focusing said lens.

10. The device of claim 9 wherein said viewing area is a screen means in said device, said lens having a magnification factor adequate for projecting at least one of said images to substantially fill said screen.

11. The device of claim 9 wherein said means mounted on said one-handed control handle means can swivel to enable said lens mounting means to raise or lower without disconnection of said focusing means.

12. A control means for a transport means for reeling a long strip wound on supply and take-up means, said strip having a plurality of discrete locations serially distributed along the length thereof, bar code means comprising marks and spaces extending longitudinally along the length of said strip for individually identifying each of said discrete locations by an individually associated address code positioned on said strip near each of the discrete locations, the positions of at least one of said marks in each of said codes always having a fixed relationship with respect to the positions of the discrete locations identified thereby, each of said codes including a plurality of sequentially occurring discrete one of said code marks separated by uniform spacing, code reading means consisting of two sensors positioned adjacent said strip, each of said sensors sequentially reading in series each discrete code mark in said codes and providing a corresponding output during the operation of said transport means, means responsive to the discrete outputs of one of said two sensor means as it reads said discrete code marks for enabling the output of the other of said sensor means as it reads such discrete marks, means responsive to the output of said other of said sensor means for indicating a detection of a selected one of said address codes, and means responsive to said code detecting means for stopping said transport means.

13. The control means of claim 12 wherein said one sensor means experiences and its output contains a matched pair of oppositely going transitions responsive to each of said marks, and means responsive to transitions in one of said directions for causing said reading of the other sensor means.

14. The control means of claim 12 wherein said strip is a reel of film, and manually movable means for selectively projecting an incremental portion of said stopped film strip.

15. A rolled web manipulation and transport means for locating one of many images assembled into a plurality of photographic means responsive to three-dimensional addressing, each of said photographic areas having an individually associated bar code printed on the film, each of said bar codes comprising an aligned series of wide and narrow marks separated by spaces, each narrow mark having the same width, each of said wide marks being twice as wide as said narrow marks, the width of each of said spaces being equal to the width of said narrow marks, said transport means comprising means for moving said rolled web between supply and take-up rolls for selectively positioning any one of many discrete segments of said web in a display area, automatic searching means for moving said web while searching for a preselected bar code associated with a first dimensional address, until a selected portion of said web identified by said preselected bar code is positioned in said display area and for thereupon stopping said web while so positioned, and discrete display means thereafter manually movable along random paths to second and third dimensional addresses within said display area, said manual movement of said display means occurring while said web is and remains stationary, said random paths being not necessarily orthogonally oriented within said display area for projecting an image from a selected incremental part of said web defined by a selected three-dimensional address where said discrete display means is located after its random movement to a manually selected incremental part.

16. The web manipulation and transport means of claim 15 and glass flats for supporting said web in a plane perpendicular to a lens which rests in a focused position upon said glass flats during periods while said web is not moving, said glass flats moving away from said web while said web is moving whereby said lens resting on said glass is moved away from its focused position, and remote control means movable with said discrete display means and said glass flats for focusing a lens associated with said discrete display means regardless of the instantaneous position of said lens on said glass flats thereby accommodating movement of said lens into and away from said focused position.

17. The web manipulation and transport means of claim 16 wherein said discrete display means comprises said lens and remote control focusing means mounted on a yoke having a space for receiving said web with said lens above the web and a light source below said web, said focusing means being controllable from a point for manipulating said yoke.

18. The web manipulation and transport means of claim 16 and means for projecting images at the point where said movable discrete display means is located, said projection being along a path extending from said web through said lens and onto an image display area, said transport means transporting said web in either of two directions, code responsive means for automatically reeling said web in either of said two directions to position a selected one of said photographic areas in said viewing area, control means for selecting one of said bar codes, means responsive to said selected one code for starting said transport means in either of said two directions in search for said selected one code, means for detecting whether said transport means is searching in the correct one of said two directions for said one code, and means for reversing the direction of said transport means if said detecting means detects that the transport means is searching in the incorrect one of said two direction.

19. The web manipulation and transport means of claim 18 and means for stopping said transport means responsive to detection of said one selected bar code, said stopping means comprising means for stopping said transport means while it is being driven at a high speed in either of said two directions, means responsive thereto for thereafter driving said transport means in an opposite direction at a slow speed, and means for thereafter repeatedly reversing the direction of said transport means a predetermined number of times according to a pre-established program for incrementally bringing said web to a stop at an exact position with diminishing web motion on each reversal.

20. The web manipulation and transport means of claim 16 wherein said remote control means is a manually controlled handle for moving said lens, and means mounted on said handle for focusing said lens.

21. The web manipulation and transport mechanism of claim 20 wherein said focusing means is a finger-controlled wheel which may be turned either while said handle is being moved or while said handle is stationary.

22. A microfiche photographic image utilization device film transport system for use with a roll of a film mounted on two reels, either of which may be a supply or a take-up reel to provide a bidirectional film travel, wherein successive areas on said film are identified by individually associated series code appearing on said film, said system comprising means for transporting said roll of film at randomly variable speeds between the supply and take-up reels, said speeds varying with the amount of film wound upon a reel, the age and condition of the transport, etc., means for reading said codes as said film is transported at said variable speeds, first motor means for driving said film in a first direction through said device, second motor means for driving said film in a reverse direction through said device, electronic control means for selectively energizing both of said motors simultaneously at different energy levels so that one of said motors may respond to a higher energy level by driving said film in one of said directions, the other of said motors responding to a lower energy and being overpowered by said one motor which is operating at said higher energy level to drive said film, the other said motors acting as a drag or a brake upon said film to maintain film tension while performing clutch and braking functions, whereby said transport is electronically controlled and does not require mechanical speed controllers, transmissions, brakes, or clutches, and whereby a reversing of the electronically controlled energy levels reverses the functions of the two motors and thus reverse the direction of film travel, means for automatically bringing said film transport to a halt responsive to a reading of a preselected code, lens and light source means mounted to be manually movable as a unit, and means for thereafter manually moving said lens and ight source as a unit for selecting and displaying an incremental portion of the individual area identified by the preselected code.

23. A bar code reading system comprising a web having a plurality of said bar codes with no specific start or stop codes, said bar codes being formed in a single track extending longitudinally along the length thereof, wherein each of said plurality of bar codes consists of an aligned series of wide and narrow marks separated by spaces, each narrow mark having the same width, each of said wide marks being twice as wide as said narrow marks, the width of each of said spaces being equal to the width of said narrow marks, sensor means positioned over the single track extending along said web area where said bar codes are located, said sensor means comprising two reading means for sequentially reading one at a time each of said aligned series of marks at each of two locations separated by a distance equal to one-and-a-half of the width of said narrow marks, the sensor at one of said reading locations acting as a strobe for the sensor at the other of said locations, with strobing occurring responsive to each code mark, and means responsive to the strobing for indicating an encoded "1" or "0" depending upon the reading then being received at the strobed location.

* * * * *